United States Patent [19]

Andrews et al.

[11] Patent Number: 4,882,129

[45] Date of Patent: Nov. 21, 1989

[54] OZONE GENERATOR CELL

[75] Inventors: Dana Andrews, Mountain View; Hiroji Hanawa, Sunnyvale, both of Calif.

[73] Assignee: Sharp Kabushiki Kaisha, Osaka, Japan

[21] Appl. No.: 89,576

[22] Filed: Aug. 26, 1987

[51] Int. Cl.$^4$ ............................................. C01B 13/11
[52] U.S. Cl. ............................. 422/186.2; 422/186.07
[58] Field of Search ..................... 422/186.07, 186.15, 422/186.16, 186.18, 186.12, 186.3, 907, 186.04

[56] References Cited

U.S. PATENT DOCUMENTS

| | | | |
|---|---|---|---|
| 950,347 | 2/1910 | Rice | 422/186.07 |
| 2,561,014 | 7/1951 | Daily | 422/186.07 |
| 3,607,709 | 9/1971 | Rice | 422/186.07 |
| 3,899,683 | 8/1975 | Lowther | 422/186.2 |
| 4,666,679 | 5/1987 | Masuda et al. | 422/186.07 |

Primary Examiner—John F. Terapane
Assistant Examiner—Susan Wolffe
Attorney, Agent, or Firm—Flehr, Hohbach, Test, Albritton & Herbert

[57] ABSTRACT

An ozone generator cell of a novel design includes a thin ceramic sheet sandwiched between a perforated metallic sheet serving as discharge electrode and a water-cooled aluminum base. Dry air or oxygen is passed over the electrode surface and a high-voltage, high-frequency electric field is applied between the electrode and the base for a corona discharge.

15 Claims, 2 Drawing Sheets

OZONE GENERATOR CELL

BACKGROUND OF THE INVENTION

This invention relates to an ozone generator cell and more particularly to a compact ozone generator cell having improved production efficiency.

Ozone is an excellent oxidizing agent. Not only has it high oxidizing power but its presence is readily detectable by its odor even at very low concentrations. For these reasons, demands for ozone are increasing in all fields of application including the thin film deposition of oxide onto silicon wafers.

Ozone is produced by passing dry air or oxygen through a high-frequency electric field. An ozone generator according to a typical design includes an internally cooled cylindrical electrode disposed inside and surrounded by a tubular electrode in coaxial relationship therewith. As the gas is passed axially through the annular space created between the electrodes, it is subjected to a high-intensity corona discharge and a portion of the oxygen in the gas is converted to ozone in the same manner in which ozone is generated in the atmosphere by lightening.

Recently, Masuda, et al. disclosed in a conference report a ceramic-based ozone generator consisting of a tubular cylinder with an inner alumina layer of thickness about 0.5 mm whch is sandwiched between discharge electrodes on the inner surface and a planar induction electrode on the outer surface and is further surrounded by an outer ceramic layer adapted to provide mechanical strength. Ozone generators of this type are now available from Shimon Kabushiki Kaisha of Tokyo, Japan.

Although these ceramic-based ozone generators seem to be able to generate ozone more efficiently than the conventional generators with concentric cylindrical electrodes, it is technologically difficult to manufacture the ceramic components required therefor. Moreover, the cooling of the ceramic components by running water does not seem sufficiently efficient and there is the serious problem of mechanical reliability because of ceramic cracks and water leaks into the ozone line.

SUMMARY OF THE INVENTION

It is therefore an object of the present invention to provide a compact ozone generator cell with improved production efficiency.

It is another object of the present invention to provide an ozone generator cell of which the components can be manufactured relatively easily and reliably especially against any possible water leak to the ozone line.

It is still another object of the present invention to provide an ozone generator cell of which the components heated by corona discharge can be cooled efficiently.

The above and other objects of the present invention are achieved by providing an ozone generator cell of a novel design having a thin ceramic sheet sandwiched between a perforated metallic sheet serving as discharge electrode and a water-cooled aluminum base. Dry air or oxygen is passed over the electrode surface as a high-voltage, high-frequency electric field is applied between the electrode and the base to produce a corona discharge. The ceramic sheet forms a thermally conductive connection with the aluminum base so as to be efficiently cooled.

BRIEF DESCRIPTION OF THE DRAWINGS

The accompanying drawings, which are incorporated in and form a part of the specification, illustrate embodiments of the present invention and, together with the description, serve to explain the principles of the invention. In the drawings.

DETAILED DESCRIPTION OF THE INVENTION

Figure 1:
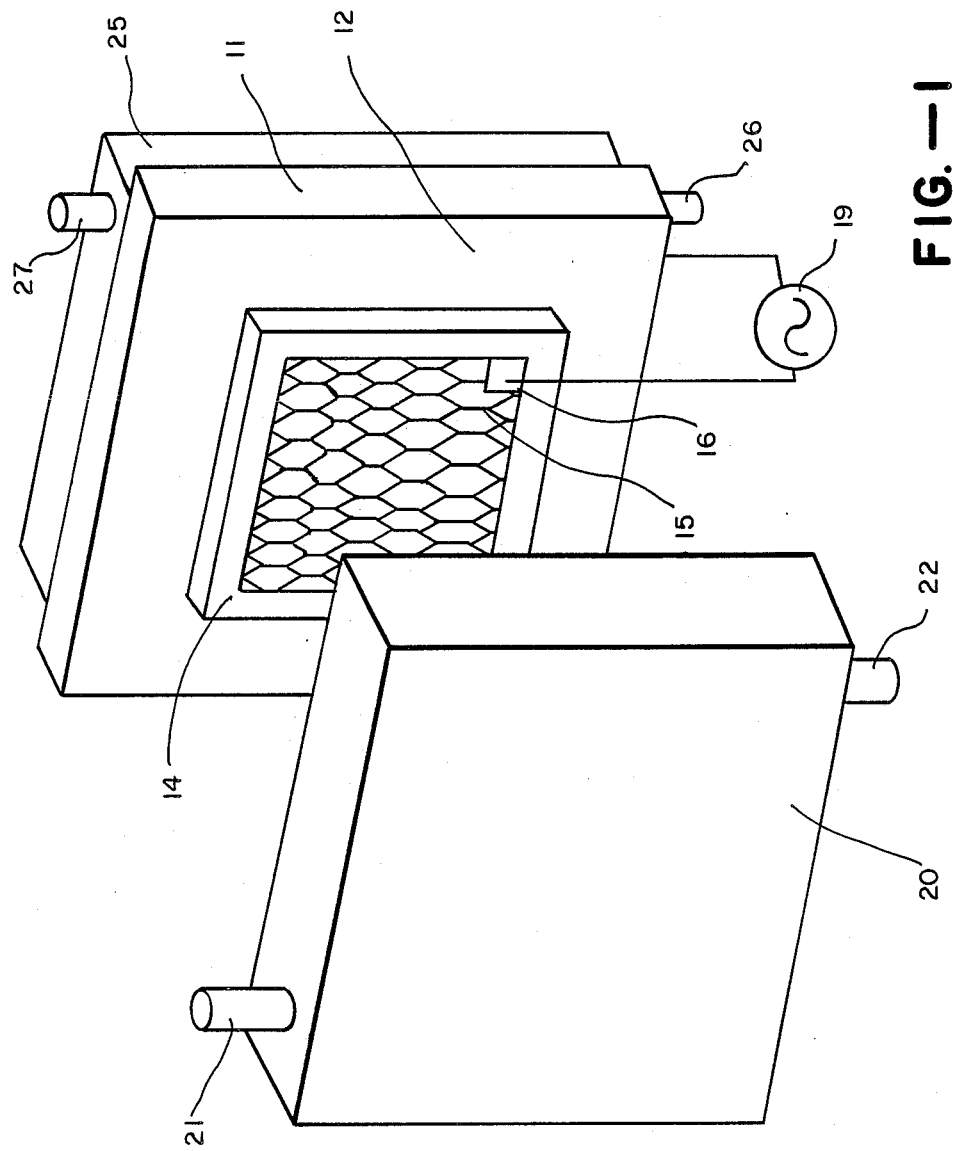
FIG. 1 is a schematic drawing for showing the principal components of an ozone generator cell embodying the present invention.

Principal components of an ozone generator cell embodying the present invention are schematically shown in FIG. 1 more for the purpose of showing their functions with respect to one another than for showing any particular design which is considered preferable.

With reference to FIG. 1, numeral 11 indicates a base made of a thermally and electrically conductive material such as aluminum or stainless steel, having a flat surface 12. A thin ceramic sheet 14, for example, of alumina with thickness preferably about 0.5 mm is attached onto this flat surface 12 of the base 11 by silicone bonding, brazing or the like to establish a thermally conductive connection with the base 11. Attached on the surface of this ceramic sheet 14 distal from the base 11 is a perforated metal sheet 15 of tungsten, aluminum, $TiB_2$, BN, nickel or the like which serves as, and hence will hereinbelow referred to as a discharge electrode. The discharge electrode 15 includes a contact area 16 at one corner of the sheet and is formed with a honeycomb pattern over the remaining area. The size of the hexagons in the pattern is preferably about 7 mm. If the hexagons are too lage, the total metal line area diminishes and efficiency of ozone production is adversely affected. If they are too small, on the other hand, the electric fields generated thereby tend to cancel one another and this also affects the generator efficiency adversely. A high-voltage, high-frequency electrical power source 19 is connected to the base 11 and the contact area 16 of the discharge electrode 15 for producing a surface corona discharge therebetween to supply energetic electrons for generating ozone. Behind the base 11 distal from the ceramic sheet 14 is a water cooling box 25 with an inlet 26 and an outlet 27 for circulating a coolant such as water therethrough from the inlet 26 to the outlet 27 to control the temperature of the base 11 and thereby also that of the discharge electrode 15. Since the ceramic sheet 14 is sufficiently thin and both the material of which the base 11 is made and the connection between the base 11 and the ceramic sheet 14 are thermally conductive, the electrode temperature can be controlled efficiently according to the present invention.

Numeral 20 indicates a gas box, or a frame with an inlet 21 and an outlet 22 for establishing a flow of gas therethrough over the surface of the discharge electrode 15 from the inlet 21 to the outlet 22. Although the gas box 20 is shown in FIG. 1 as being separated from the base 11, this is for the purpose of showing the attachment of the ceramic sheet 14, etc. to the base 11. When the ozone generator is assembled, the gas box 20 is attached to the surface 12 of the base 11, containing the ceramic sheet 14 therein and forming an air-tight connection with the base 11 such that a gas such as dry air or oxygen entering the gas box 20 flows therethrough in contact with the discharge electrode 15.

Figure 2:
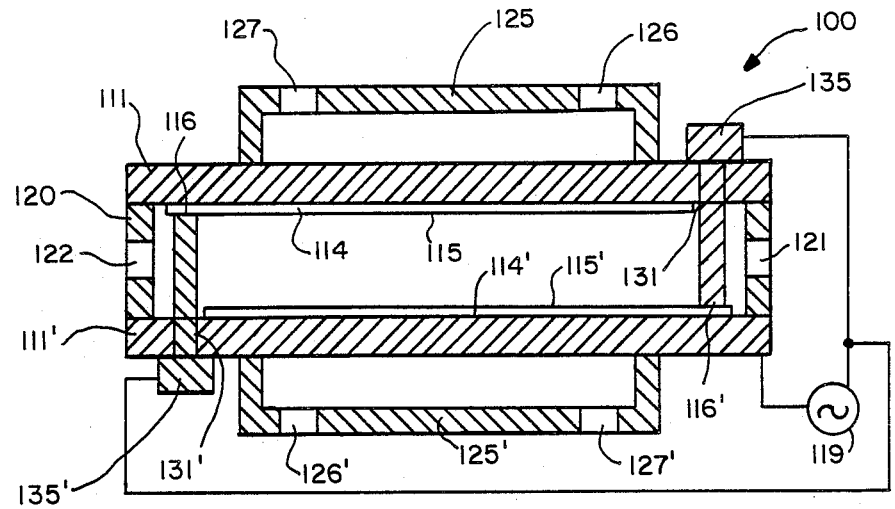
FIG. 2 is a schematic sectional view of another ozone generator cell embodying the present invention.

FIG. 2 is a schematic sectional view of another ozone generator cell 100 according to a preferred embodiment of the present invention wherein components which are similar or equivalent to those shown in FIG. 1 and described above are indicated by numerals with the same two lower digits. Thus, numerals 111 and 111' in FIG. 2, for example, individually indicate a thermally and electrically conductive base. This cell 100 is characterized as having two ceramic sheets 114 and 114' attached respectively to bases 111 and 111' and disposed in such a way that they are parallel to each other and discharge electrodes 115 and 115' on their surfaces face each other, separated by a distance of about ½ inch. Between the bases 111 and 111' is a frame 120 with an inlet 121 and an outlet 122 such that the frame 120 and the two bases 111 and 111' together form an air-tight enclosure inside which a gas, such as dry air or oxygen introduced thereinto through an inlet 121 can flow over the discharge electrodes 115 and 115' to an outlet 122. Similarly, numerals 125 and 125' indicate water cooling boxes respectively with a liquid inlet 126 or 126' and a liquid outlet 127 or 127' for cooling the bases 111 and 111', respectively.

Each base 111 or 111' is provided with a hole 131 or 131' through which a plug 135 or 135' is inserted to reach the contact area 116' or 116 of the discharge electrode 115' or 115 opposite from the hole 131 or 131' through which it is inserted. The plugs 135 and 135' are adapted to be pressed against the contact areas 116' and 116, respectively, thereby serving to electrically connect the discharge electrodes 115 and 115' to a high-voltage, high-frequency power source 119 which is also connected to the bases 111 and 111' such that a corona discharge takes place between the discharge electrodes 115 and 115' and the bases 111 and 111'.

Figure 3:
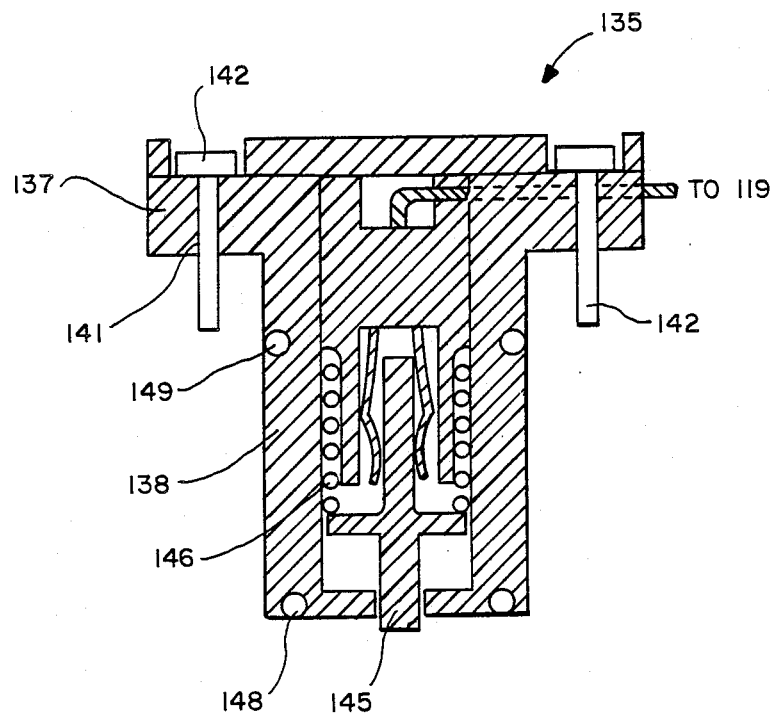
FIG. 3 is a schematic sectional view of a connector which is a part of the ozone generator cell shown in FIG. 2.

FIG. 3 shows the structure of the plug 135, the other plug 135' being structured identically. It comprises a flange section 137 and a tubular cylindrical section 138 both of an electrically insulative material such as teflon. The flange section is provided with a plurality of holes 141 with bolts 142 passed therethrough for fastening the plug 138 to the base 111. The tubular cylindrical section 138 contains therein a metallic contact piece 145 adapted to be pressed against the contact area 116' of the discharge electrode 115' against the biasing force provided by a spring 146 as the plug 135 is positioned inside the hole 131 and the bolts 142 are tightened, thereby establishing a tight electrical contact between the contact area 116' and the power source 119. Numerals 148 and 149 indicate O-rings provided respectively on the end surface of the cylindrical section 138 to accomplish a gas-tight contact between the contact area 116' and the plug 135 and on the side surface of the plug 138 to establish an air-tight seal between the plug 135 and the inner wall of the hole 131 in the base 111.

Ozone generator cells according to the present invention can be manufactured easily and inexpensively, having much simpler structure, for example, than a generator requiring a ceramic cylinder in layers as described above. Use of an aluminum base plate enables the electrode-carrying ceramic sheet to be cooled more efficiently and reliably, and this contributes to an improved efficiency in ozone production. According to the present invention, therefore, ozone can be produced at a lower cost of power and by a smaller cell per unit of ozone produced.

The embodiments of the present invention described above were presented for purposes of illustration and description. It is not intended to be exhaustive or to limit the invention to the precise form disclosed, and many modifications and variations are possible in light of the above teaching. For example, more than one ceramic sheet of the type shown at 14 with a perforated metal electrode thereon may be affixed on a single base. The figures are not intended to depict any preferred dimensional relationships. Any modifications and variations that may be apparent to a person skilled in the art are intended to be included within the scope of this invention.

What is claimed is:

1. An ozone generator cell comprising
    one or more combinations each including a thermally conductive solid metallic plate-like base forming a part of water cooling means and having a planar flat surface, a planar ceramic sheet separated from cooling water of said cooling system by said base and attached by a surface-to-surface contact to said flat surface of said base, and a discharge electrode attached to said cramic sheet distal from said base,
    enclosure means with an inlet and outlet adapted to cause a gas to flow therein from said inlet to said outlet over said discharge electrode, and
    means for causing a corona discharge between said discharge electrode and said base.

2. The ozone generator cell of claim 1 wherein said base comprises aluminum.

3. The ozone generator cell of claim 1 wherein ceramic sheet is attached to said base in thermally conductive relationship.

4. The ozone generator cell of claim 1 wherein said ceramic sheet is attached to said base by silicone bonding.

5. The ozone generator cell of claim 1 wherein said ceramic sheet is brazed to said base.

6. The ozone generator cell of claim 1 wherein said ceramic sheet comprises alumina.

7. The ozone generator cell of claim 1 wherein said discharge electrode comprises a perforated metal sheet.

8. The ozone generator cell of claim 7 wherein said perforated metal sheet has a honeycomb pattern.

9. The ozone generator cell of claim 1 wherein said discharge electrode comprises tungsten.

10. The ozone generator cell of claim 1 wherein said discharge electrode comprises aluminum, $TiB_2$ or BN.

11. The ozone generator cell of claim 1 wherein two of said combinations are disposed opposite to each other, sandwiching said enclosure means therebetween.

12. The ozone generator cell of claim 11 wherein said discharge electrodes of said two combinations are separated by about ½ inch.

13. The ozone generator cell of claim 11 further comprising two plugs each supported by one of said combinations in an electrically insulated manner and establishing an electrical contact with the discharge electrode of the other of said combinations.

14. The ozone generator cell of claim 13, wherein each of said plugs comprises a conductor rod surrounded by a tubular insulative member and biasing means for pressing said rod against one of said discharge electrodes.

15. The ozone generator cell of claim 1 wherein said corona discharge causing means comprise a high-frequency high-voltage source.

* * * * *

UNITED STATES PATENT AND TRADEMARK OFFICE
CERTIFICATE OF CORRECTION

PATENT NO. :     4,882,129
DATED      :     November 21, 1989
INVENTOR(S) :    Dana Andrews, et al.

It is certified that error appears in the above-identified patent and that said Letters Patent is hereby corrected as shown below:

In the title page, please change "[73] Assignee: Sharp Kabushiki Kaisha, Osaka, Japan" to read:

--[73] Assignee: Applied Materials, Inc., Santa Clara, California--.

Signed and Sealed this

Twelfth Day of February, 1991

Attest:

HARRY F. MANBECK, JR.

*Attesting Officer*         *Commissioner of Patents and Trademarks*